US007050605B2

(12) United States Patent
Gerson et al.

(10) Patent No.: US 7,050,605 B2
(45) Date of Patent: May 23, 2006

(54) DESIGNING TREAD WITH FRACTAL CHARACTERISTICS

(76) Inventors: Jonas Elliott Gerson, 12 Charnwood Dr., Montebello, NY (US) 10901-3504; Donald Franklin Gerson, 12 Charnwood Dr., Montebello, NY (US) 10901-3504

(*) Notice: Subject to any disclaimer, the term of this patent is extended or adjusted under 35 U.S.C. 154(b) by 626 days.

(21) Appl. No.: 10/039,195

(22) Filed: Jan. 2, 2002

(65) Prior Publication Data
US 2003/0156738 A1 Aug. 21, 2003

(51) Int. Cl.
*G06K 9/00* (2006.01)
(52) U.S. Cl. ............................... 382/100; 73/9; 73/146
(58) Field of Classification Search ............... 382/100, 382/108, 249; 345/582, 583, 584, 585, 586, 345/587, 588; 152/5, 209.1, 209.15, 904; 73/9, 28.06, 146, 146.2, 783, 821, 845, 851, 73/862.12, 379.06, 529; 156/95, 96, 114, 156/127, 909
See application file for complete search history.

(56) References Cited
U.S. PATENT DOCUMENTS

| | | | | |
|---|---|---|---|---|
| 3,794,093 A | * | 2/1974 | Boscaino | 152/208 |
| 4,917,162 A | * | 4/1990 | De Longcamp | 152/5 |
| 5,075,067 A | * | 12/1991 | Rockarts et al. | 264/326 |
| 5,693,714 A | * | 12/1997 | Bauman et al. | 525/104 |
| 5,814,718 A | | 9/1998 | Andresen et al. | 73/9 |
| 5,859,919 A | * | 1/1999 | Holland et al. | 382/108 |
| 6,467,149 B1 | * | 10/2002 | Sentmanat | 29/564.6 |
| 6,641,471 B1 | * | 11/2003 | Pinheiro et al. | 451/526 |

OTHER PUBLICATIONS

Majumdar, A. and Bhushan, B. Fractal Model of Elastic-Plastic Contact Between Surfaces, Journal of Tribology. 113:1-11, 1991.
Majumdar, A. and Bhushan, B. Role of Fractal Geometry in Roughness Characterization and Contact Mechanics of Surfaces. Journal of Tribology, 112:205-216, 1990.
Majumdar, A. and Tien, C.L. Fractal Characterization and Simulation of Rough Surfaces. Wear, 136:313-327, 1990.
Pullen J. and Williamson, J.B.P. On the plastic contact of rough surfaces. Proc. Roy. Soc. London A. 327:159-173, 1972.

(Continued)

*Primary Examiner*—Kanjibhai Patel
*Assistant Examiner*—Abolfazl Tabatabai
(74) *Attorney, Agent, or Firm*—Gerry J Elman; Elman Technology Law, P.C.

(57) ABSTRACT

A methodology is provided for designing traction surfaces intended to grip and provide traction on substrate surfaces. Fractal geometry is used to design tire treads, shoe treads, elastomeric traction surfaces, drive rollers, friction wheels for material locomotion or power transmission and belts for pulley drives, and such related devices requiring friction to transmit a tractional force. The methodology is performed empirically and/or analytically. The empirical method involves iterative design and testing of traction surfaces having fractal characteristics to maximize traction against a particular substrate surface. The analytical method uses analysis of substrate surfaces, and the design and development of appropriately scaled and contoured traction surfaces having fractal characteristics. The tread pattern generally contains design motifs spanning at least two doublings in linear dimension as to length, width and/or depth.

23 Claims, 14 Drawing Sheets

General Fractal Tread Design

OTHER PUBLICATIONS

. Stachowiak, G.W. and Batchelor, A.W. . Fundamentals of Contact Between Solids. Engineering Tribology, Elsevier, NY.Chapter 10, 527-556, 1994.

Sayles, R.S. and Thomas, T.R. The Spatial Representation of Surface Roughness by Means of the Structure Function: A Practical Alternative to Correlation. Wear. 42:263-276, 1977.

Whitehouse, D.J. and Archard, J.F. The properties of random surfaces of significance in their contact. Proc. Roy. Soc. Lond. A. 316, 97-121, 1970.

* cited by examiner $z = \sin xy + \frac{1}{2}\sin\left(\frac{xy}{2}\right) + \frac{1}{4}\sin\left(\frac{xy}{4}\right) + \frac{1}{8}\sin\left(\frac{xy}{8}\right) + \frac{1}{16}\sin\left(\frac{xy}{16}\right)$ $z = \sin xy + \frac{1}{2}\sin\left(\frac{xy}{2}\right) + \frac{1}{4}\sin\left(\frac{xy}{4}\right) + \frac{1}{8}\sin\left(\frac{xy}{8}\right) + \frac{1}{16}\sin\left(\frac{xy}{16}\right)$ $$z = \sin xy + \frac{1}{2}\sin\left(\frac{xy}{2}\right) + \frac{1}{4}\sin\left(\frac{xy}{4}\right) + \frac{1}{8}\sin\left(\frac{xy}{8}\right) + \frac{1}{16}\sin\left(\frac{xy}{16}\right)$$

DESIGNING TREAD WITH FRACTAL CHARACTERISTICS

BACKGROUND OF THE INVENTION

1. Field of the Invention

This invention relates to improved methods for designing treads and treads so designed. The invention provides a method for designing traction surfaces intended to grip and provide traction on other surfaces, i.e. substrate surfaces. Traction surfaces so designed may be for tires, shoes, drive belts, and in general for tread applications where high traction is desirable.

2. Background

Tread design as currently executed is an experimental process, with extensive "cut-and-try" techniques applied. Tires are very common traction devices and are a typical example for which an experimental design process is used. Treads for tires are almost exclusively designed as variations on the theme of a repetitive series of blocks on a base with full-depth spaces between them. Block shape is varied from shapes as simple as a cube to complicated multiple sizes or irregular shapes. The spaces between the blocks can range from narrow to wide or they may be slits or sipes. The spaces can be normal to the surface or tilted in the direction of action of the traction surface. The outermost or contact surface of the blocks can be smooth or patterned with a repetitive grid-like surface modulation with a depth that is a small fraction of the block dimension. Typically, patterns of the blocks are varied over the tread surface to provide improved characteristics at inner or outer edges, at the toe or heel of a shoe tread, or to provide improved foreign matter expulsion from the traction area.

SUMMARY OF THE INVENTION

The present invention provides a method for designing better tread surfaces intended to grip and provide traction on other surfaces, i.e. substrate surfaces. The invention provides a systematic approach and method to design a surface-customized tread pattern which provides high traction.

This invention provides a method to design a tread pattern particularly adapted for use in contact with an intended substrate surface, wherein design motifs are chosen to provide elements having a range of sizes to maximize interaction with the substrate surface. It is a feature of the invention to provide treads with excellent efficiency of contact with the intended substrate surface.

The invention applies the concepts of fractal geometry to the design of traction surfaces. The inventive method may be used to design a variety of treads, including tire treads, shoe treads, elastomeric traction surfaces, drive rollers, friction wheels for material locomotion or power transmission, and belts for pulley drives and related devices requiring friction to transmit a tractional force. In the case of tires, the invention utilizes individualized tread designs which may be adapted for contact with any of various surfaces including snow, mud, sand, gravel and normal road surfaces. As a result skidding may be minimized while promoting safe use.

Fractals are geometric shapes having repeated patterns of scale-symmetric self-similar character. The topography of a surface may be represented approximately by a fractal. See, e.g., literature references 1–3 cited below. The fractal representation of surfaces shows that the size distribution of contact spots typically follows a numerical power series. One fractal characteristic is that a fractal pattern includes a geometric shape of a specific size (as measured by one or more of its dimensions of length, width or height), in addition to a series of sets of progressively smaller similarly-shaped elements, the ratio of the sizes of each set being related by a constant factor. In some fractals, each set of elements of these geometric shapes is twice the size of the next smaller set of elements. The relationship between a group of elements of one size and a group of the next larger or smaller set of elements is referred to herein as a "doubling" (regardless of whether the factor is two.)

The present inventors have discovered that treads having fractal characteristics, designed specifically for the surface substrate intended for contact, show increased friction between the tread and surface substrate, and result in improved traction and increased efficiency of surface contact, with less skid and low slippage between the traction surface and the substrate surface.

It is an advantage of the invention that treads designed to have fractal characteristics by means of higher correspondence between the tread motif and substrate surface, provide improved performance.

The invention utilizes a design method which includes steps to characterize the topography of the substrate surface and then generate an equivalent fractal geometry within a range of tread value motifs, to encompass the substrate surface in contact with the tread. The substrate surface thus can be viewed as a template for which to design a traction surface with fractal geometry characteristics for the tread, providing improved fit between the protuberances and depressions of the tread and the spatial distribution of protuberances and depressions of the substrate.

The general tread design method of the invention is performed by:

Selecting a substrate surface intended for contact with the traction surface;

Characterizing the topography of the substrate surface;

Selecting a pattern having fractal characteristics corresponding to the topography of the substrate surface; and Generating a tread design which incorporates the pattern.

The design method of the invention may be performed in various ways, one of which may be characterized as an empirical embodiment of the method and another of which may be characterized as analytical. Each approach to tread design provides practical utility: the empirical design method requires less knowledge of the substrate surface characteristics; the analytical design method starts with more detailed knowledge of the substrate.

In an embodiment of the method described above, the topography of the substrate surface can be characterized by measuring the substrate and then establishing a substrate-particle-size-frequency-histogram. In a particular embodiment, the method utilizes a surface-size frequency histogram to design tread elements whose size frequencies parallel substrate-particle-size frequencies and also have appropriate "size scale" for contact. The range of sizes of tread protuberances to be designed for a substrate to be contacted by the traction surface is similar to the range of sizes of substrate protuberances. In this embodiment, the relative number of elements in each size group in the tread design pattern corresponds to the relative number of elements in a corresponding size group in the substrate intended for contact with the traction surface.In some embodiments of the invention, the geometric shape of each tread element is identical to each other tread element. The tread elements (smaller than the largest ones) have dimensions wherein the size of each set of progressively smaller elements is decreased from that of the next-larger-size elements by a factor relative to a numerical power series. The aforesaid numerical power series may optionally be represented by a power law expression which defines a fractal.

In a particular embodiment of the invention, the design pattern generated corresponds to an approximation of a measured surface.

In another embodiment of the invention, the pattern generated is represented by the measured surface itself.

In a particular embodiment of the invention, the aforesaid numerical power series expression is represented by 2 to the power of n, where n is an integer.

In another embodiment of the invention, the aforesaid numerical power series expression is represented by 3 to the power of n, where n is an integer.

In yet another embodiment of the invention, the aforesaid numerical power series expression is represented by 2 to the power of n, where n is a number between 1 and 2, inclusive.

In still another embodiment of the invention, the aforesaid numerical power series expression is represented by n to the power of 2, where n is an integer.

In general, the aforesaid numerical power series expression is a fractal power law expression represented by a power series, for example, of the form $a_0$, $a_1x$, $a_2x^2, a_3x^3, \ldots, a_nx^n$.

In some embodiments of the invention, the geometric shape of the tread elements is symmetrical.

In other embodiments of the invention, the geometric shape of the tread elements is asymmetrical.

In certain embodiments of the invention, the tread elements include rectilinear shapes.

In certain embodiments of the invention, the tread elements include curvilinear shapes.

In some embodiments of the invention, the tread elements include those with rectilinear and with curvilinear shapes.

In some embodiments of the invention, the tread elements include circular shapes.

In some embodiments of the invention, the tread elements include triangular shapes.

In some embodiments of the invention, the tread elements include cone shapes

In some embodiments of the invention, the tread elements include elements of H shape.

In some embodiments of the invention, the tread elements include cylindrical shapes.

In particular embodiments of the invention, the resulting tread design pattern is at least twice the size of the linear span of the largest geometric shape in the pattern. In such embodiments the total width of the contact area for which tread is being designed equals the width of two of the largest tread elements, or the total length of the contact area for which tread is being designed equals the length of two of the largest tread elements, or both.

In another embodiment, the width of the contact area for which tread is being designed equals the width of the largest tread element in the design, the total length of the contact area for which tread is being designed equals the length of the largest tread element, or both.

In another embodiment, the width of the contact area for which tread is being designed is greater than the width of the largest tread element in the design but less than the width of two of the largest tread elements, or the total length of the contact area for which tread is being designed is greater than the length of the largest tread element but less than the length of two of the largest tread elements, or both.

In another embodiment, the width of the contact area for which tread is being designed is greater than the width of two of the largest tread elements, or the total length of the contact area for which tread is being designed is greater than the length of two of the largest tread elements, or both.

a.) In another embodiment, the tread contains tread elements in at least three sets of sizes. The relative sizes of the tread elements in each set correspond to terms in a numeric power series. Where each of successive terms in a numeric power series on which a design is based is half the preceding term, three terms would describe sizes of sets of tread elements, representing two doublings. Factors other than two could be used, for example:

The tread can have a series of elements each of whose size represents sizes related by the series 2 to the n−1, 2 to the n and 2 to the n+1 power. The tread can have a series of elements each of whose size is the square of the next smaller size. The tread can have a series of elements each of whose size is the cube of the next smaller size. The tread can have a series of elements each of whose size is three times the next smaller size. The tread can have a series of elements each of whose size is 2.01 times the next smaller size. The tread can have a series of elements each of whose size is 3 times the next smaller size. The tread can have a series of elements each of whose size is 23 times the next smaller size.

In general, a numeric series can represent the series of tread element sizes, given that the number of tread element sizes in the pattern is at least three, and the relative increase in size from one element size to the next larger element size is identical, for example; if one element is twice the size of the next smaller element, then each element will be twice the size of the next smaller element.

The empirical embodiment includes selecting a pattern having fractal characteristics which involves generating a plurality of experimental treads having fractal characteristics and generating an experimental surface which approximates or is the measured surface substrate.

The general method of the present invention is a method to design tread for a traction surface comprising steps: to select a substrate surface intended for contact with the traction surface; to characterize the topography of the substrate surface; to select a pattern having fractal characteristics corresponding to the characterized topography of the substrate surface; and then to generate a tread design which incorporates the selected pattern.

An empirical embodiment of the present invention includes the following method steps: (a) The step to select a substrate surface intended for contact with the traction surface comprises (a.1) identifying acceptable traction between the traction surface and the substrate surface. (b) The step to characterize the topography of the substrate surface comprises (b.1) measuring the dimensions of the substrate surface with which said tread is intended for contact. (c) The step to select a pattern having fractal characteristics corresponding to the characterized topography of the substrate surface comprises c.1) generating a plurality of experimental treads having fractal characteristics and also c.2) generating an experimental surface approximating or being the measured surface. (d) The step to generate a tread design which incorporates the pattern is followed by e) testing the tread design by measuring the friction force between each of the experimental treads and the experimental surface. (f) Repeating these steps until the measured friction force between one of the experimental treads and said experimental surface is at least the acceptable traction identified. (g) selecting the pattern of an experimental tread having at least the acceptable traction identified in step (a.1); and (h) generating a final tread design which incorporates the selected pattern.

An analytical embodiment of the present invention includes the following method steps: the step of (b) characterizing the topography of the substrate surface comprises (b.1) generating a surface roughness profile; (b.2) representing the topography as a log-log power spectrum; (b.3) subjecting the power spectrum to a waveform transformation;

and (b.4) approximating the transform of the topography by an ideal waveform; and the step of (c) selecting a pattern having fractal characteristics corresponding to said characterized topography of the substrate surface comprises (c.1) selecting a pattern having fractal characteristics that matches the ideal waveform approximating the substrate surface substrate topography.

An embodiment of the general method of the invention includes the design of a pattern which has a plurality of elements, each of the elements being a member of a size group, wherein the length of one or more dimensions of each member of each size group is the same as that of the corresponding dimension of the other members of the size group, and wherein the relative number of elements in each size group in the pattern corresponds to the relative number of elements in a corresponding size group in the substrate intended for contact with the traction surface.

DETAILED DESCRIPTION OF THE INVENTION

Figure 1:
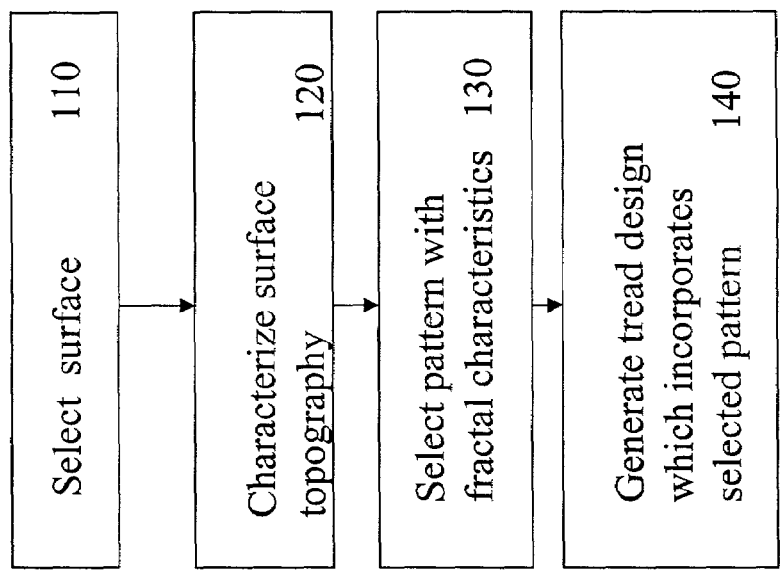
FIG. 1. Flow diagram showing general fractal tread design.

Empirical Method
Improved tread design using fractals may be performed empirically according to the invention, by:
Selecting a substrate surface intended for contact with the traction surface including identifying acceptable traction between the tread and substrate surface;
Characterizing the topography of the substrate surface, including measuring the intended substrate surface;
Selecting a pattern having fractal characteristics;
Generating a tread design which incorporates a selected pattern;
Testing the tread on the selected surface to determine if the traction is at least the previously identified acceptable traction; and if not, then:
Iteratively repeating the process of
   Generating a tread design which incorporates a selected pattern; and
   Testing that tread design on the selected surface until the measured traction between the tread and substrate surface is at least the previously identified acceptable traction;
Selecting a tread design having acceptable traction; and
Generating a final tread design incorporating the selected pattern.

In some embodiments of the Empirical Method, the relative number of elements in each size group in the tread design pattern corresponds to the relative number of elements in a corresponding size group in the substrate intended for contact with the traction surface Analytical Method
According to the invention, an analytical method to generate a design for tread having fractal characteristics involves:
Selecting a substrate surface intended for contact with the traction surface;
Characterizing the topography of the substrate surface comprising substeps of:
   Measuring the intended substrate surface;
   Generating a substrate surface roughness profile;
   Representing the profile as a log-log power spectrum;
   Subjecting the log-log power spectrum to a Fourier transformation;
   Approximating the transform by an ideal waveform;
Selecting a tread pattern having fractal characteristics that match the ideal waveform approximating the substrate surface topography; and
Generating a tread design incorporating the selected pattern.

The Analytical Method of this invention is begun by measuring the topography of the substrate surface intended to be in the range of contact with the traction surface. This set of data is then used to develop a relationship between the length of the variations in surface, with their frequency of occurrence such that, in some embodiments of the invention, the relative number of elements in each size group in the tread design pattern corresponds to the relative number of elements in a corresponding size group in the substrate intended for contact with the traction surface (see literature references 1–3 cited below). Another way to measure the topography of the surface is described in U.S. Pat. No. 5,859,919, the disclosure of which is incorporated herein by reference.

The data is then represented in a log-log power spectrum. The power spectrum is then subjected to a logarithmic transformation, followed by a waveform transformation (typically a Fourier transform), thus providing the frequency of occurrence of each class of length on a log-log scale. The Fourier transform procedure reduces a complex measured 'waveform' into a sinusoidal equation that simulates the characteristics of the measured waveform. The measured waveform is a measurement of the variation in the height (or z) dimension with distance along either the width (x) or depth (y) dimensions (both would give equivalent results). A natural consequence of the analytical technique is that it results in a sinusoidal function with fractal characteristics in both the x, y and z dimensions. The characteristics of these distributions of surface amplitudes relative to the linear dimensions are then simulated by a surface of the tread having fractal characteristics.

The substrate surface profile is typically an irregular waveform, with the surface represented as a function of height vs. horizontal displacement. A sufficiently long profile is required to provide adequate data for a waveform transformation resulting in a series of sinusoids, which when added together, recreate the original irregular profile. Each sinusoid is characterized by amplitude or height, and a wavelength or frequency. By plotting the log of the amplitude against the log of the frequency (inverse wavelength) result from the waveform analysis, it is then possible to define a pattern to apply to the tread design. Such a visualization facilitates the selection of a power series of sinusoids which, when added together, result in a simulation of the original surface profile. The amplitude and wavelength of each sinusoid, and the number of sinusoids in a given dimensional range, are then used to determine the width, depth and frequency of occurrence of each surface element in the design of the tread having fractal characteristics. The tread design will then match the scales of length and frequencies of the substrate surface. In a version of this embodiment, the variation in tread motif along the contact area is extended for at least twice the range of the dimensions of substrate protuberances or voids.

Definitions

Approximating a measured surface:
  Generating a contact surface having comparable terrain to that of a selected surface in relative position, elevation and frequency of occurrence of surface topographical features.

Elastomer:
  Any of various polymers having the elastic properties of natural rubber.

Fourier Analysis:
  Analysis based on the mathematical function first formulated by Jean-Baptiste-Joseph Fourier in 1807. The function, known as the Fourier transform, describes the any fluctuating pattern in the physical world in terms of a series of additive sinusoids each with a distinct wavelength, amplitude and phase.

Fractal:
  A geometric pattern that is repeated at ever smaller scales to produce irregular shapes and surfaces that cannot be represented by classical geometry. Fractals are used especially in computer modeling of irregular patterns and structures in nature. A fractal is a rough or fragmented geometric shape that can be subdivided in parts, each of which is (at least approximately) a smaller copy of the whole. Fractals are generally self-similar (bits look like the whole) and independent of scale (they look similar, no matter how close you zoom in). Many mathematical structures are fractals; e.g. Sierpinski triangle, Koch snowflake, Peano curve, Mandelbrot set and Lorenz attractor. Fractals also describe many real-world objects that do not have simple geometric shapes, such as clouds, mountains, turbulence, and coastlines. Benoit Mandelbrot, the discoverer of the Mandelbrot set, coined the term "fractal" in 1975 from the Latin fractus or "to break".

Fractal Characteristics:
  One fractal characteristic is that a fractal pattern includes a geometric shape of a specific size (as measured by one or more of its dimensions of length, width or height), in addition to a series of sets of progressively smaller similarly-shaped elements, the ratio of the sizes of each set being related by a constant factor or power law.

Fractal geometry:
  A generalization of Euclidean geometry that posits a non-integer dimension for describing irregular and fragmented patterns.

Log-log power spectrum:
  Plot of the logarithm of amplitude vs the logarithm of frequency Power Series:
  A series of the form $a_0 + a_1 x + a_2 x^2 + a_3 x^3 + \ldots + a_n x^n + \ldots$ Sipes:
  Fine lines or grooves cut into the tread of tires. They allow the tire to flex and give better traction on wet surfaces.

Size-Scale:
  The relative size of tread elements compared to size of surface substrate particles with which the elements make contact.

Topography:
  Detailed, precise description of a place or region. Graphic representation of the surface features of a place or region on a map, indicating their relative positions and elevations. A description or an analysis of a structured entity, showing the relations among its components. The surface features of an object.

Traction:
  Adhesive friction, as of a wheel on a track or a tire on a road.

Detailed Description

General Tread Design Method

As shown in the flow chart of FIG. 1, the general tread design method according to the present invention is primarily characterized by:
selecting a surface intended for contact with the tread to be designed 110;
characterizing the topography of said surface 120;
selecting a repeating pattern having fractal characteristics corresponding to said topography of said surface 130; and
generating a tread design which incorporates said repeating pattern 140.

EXAMPLE A

General Tread Design Method

As shown above the steps in the General Tread Design method are:
  Select a surface intended for contact with the tread to be designed
  Characterize the substrate topography
  Select a repeating pattern having fractal characteristics
  Generate a tread design which incorporates the repeating pattern Select a surface intended for contact with the tread to be designed For this General Tread Design Example A, we select a roadway of pebbles wherein the diameters of the pebbles and the spaces between them range from 1 to 10 mm in the horizontal plane.

Characterize the Substrate Topography

In this General Tread Design Example A, by choosing substrate having a specific range of sizes, namely, ranging from 1 mm to 10 mm. we characterize the substrate in the horizontal plane. We choose these dimensions as an ideal case for the purpose of discussion; for the empirical and analytical method, these dimensions would be measured. Substrate measurements can be made in various ways depending on the type of substrate and required measurement precision. Histograms can be made from manual measurements, for example to measure loose gravel. A profileometer can be used to measure the substrate for a paved road. Stereology can be used to cut a block, make a slice, photograph the slice and then analyze the photograph micrographically. As will be shown in further steps of the General method, we will utilize these pebble dimensions (dimensions of the substrate) to perform calculations for which to determine a tread design pattern which corrresponds to the specific dimensions of the substrate topography.

Selecting a Repeating Pattern Having Fractal Characteristics Corresponding to the Topography of the Surface Substrate

EXAMPLE A1

Horizontal Plane

We choose a design with fractal characteristics appropriate to the surface intended for contact. To properly make contact with the geometry of the substrate, we choose to design a nested cylindrical shape tread to contact the pebble substrate.

We determine that the size range of the protuberances in the tread to be designed must range from a smaller diameter than the smallest element of the substrate to a larger diameter than the largest element of the substrate. For a diameter less than 1 mm requires that we start with a smallest protuberance size of 0.5 mm diameter. Doubling this, the next size becomes 1 mm. Doubling again the next size becomes 2 mm., then 4 mm. then 8 mm. until obtaining a protuberance larger than the largest element in the substrate, which is 16 mm. So our proposed range for the sizeprotuberances of the tread design is 0.5 mm to 16 mm. We recall that the range for the surface is 1 mm to 10 mm.

Figure 4A:
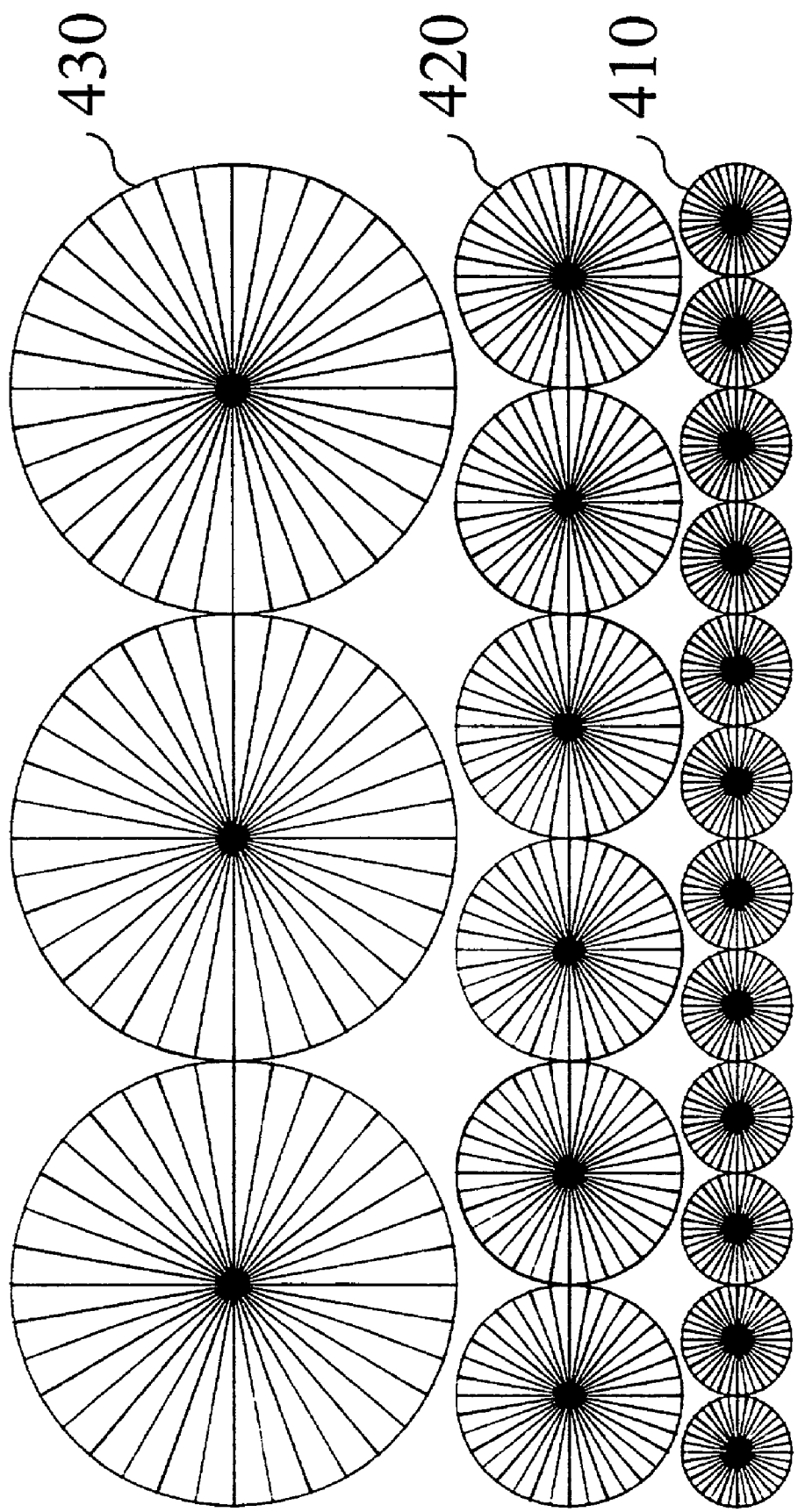
FIG. 4A. Empirical Method. Diagram of Sierpinski cone tread, top view.
Figure 4B:
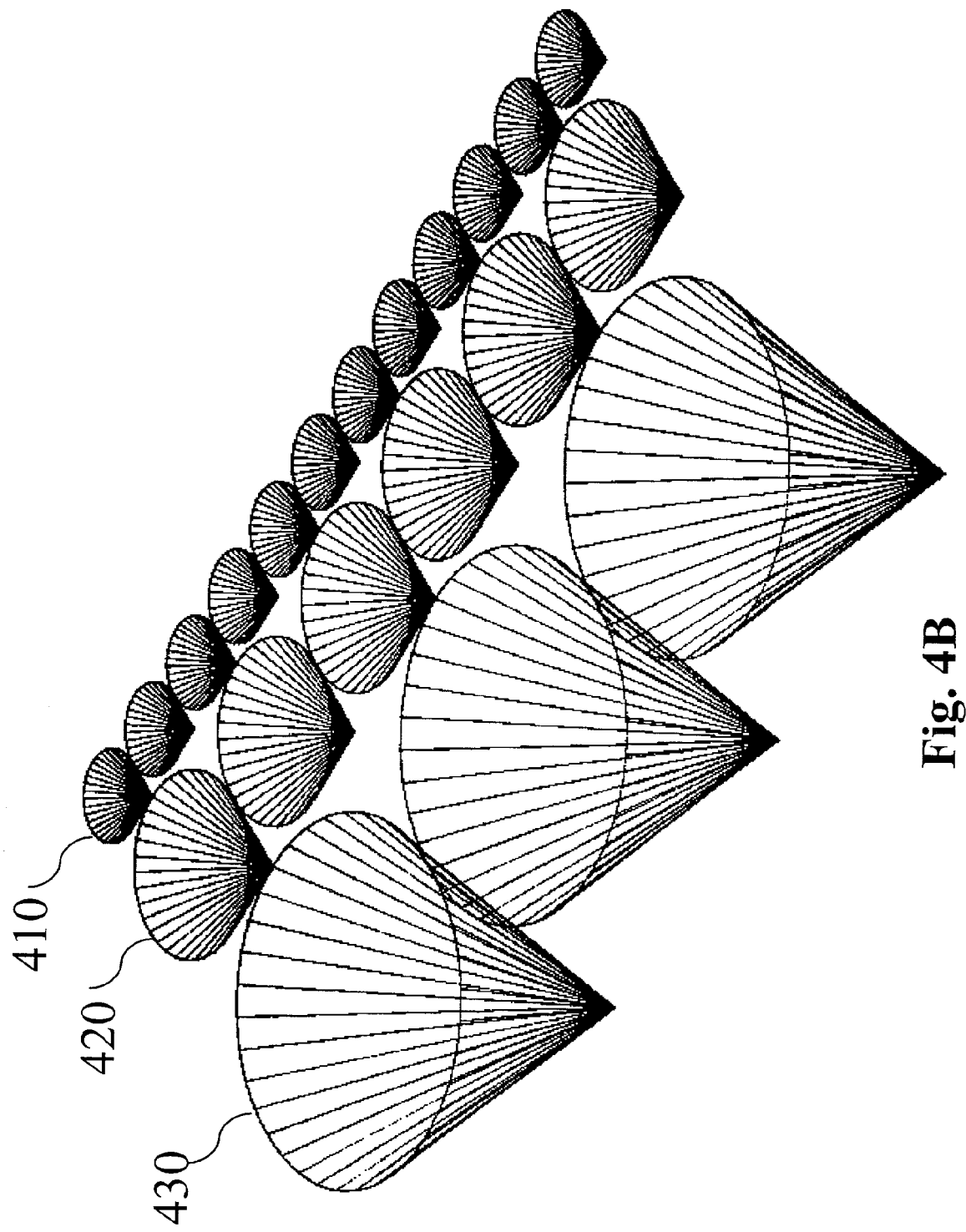
FIG. 4B. Empirical Method. Diagram of Sierpinski cone tread, perspective view.

This results in a fractal design, which would be a group of nested cylinders, both protuberances and voids, with diameters of 0.5, 1, 2, 4, 8, 16 mm. This design features a power series of self-similar circular elements, forming a fractal design. FIG. 4A shows a top view of three sizes of cone-shaped elements of increasing diameters, represented by 410, 420 and 430. FIG. 4B shows the perspective view of the three sizes of cone-shaped elements of increasing size, 410, 420 and 430.

Figure 5:
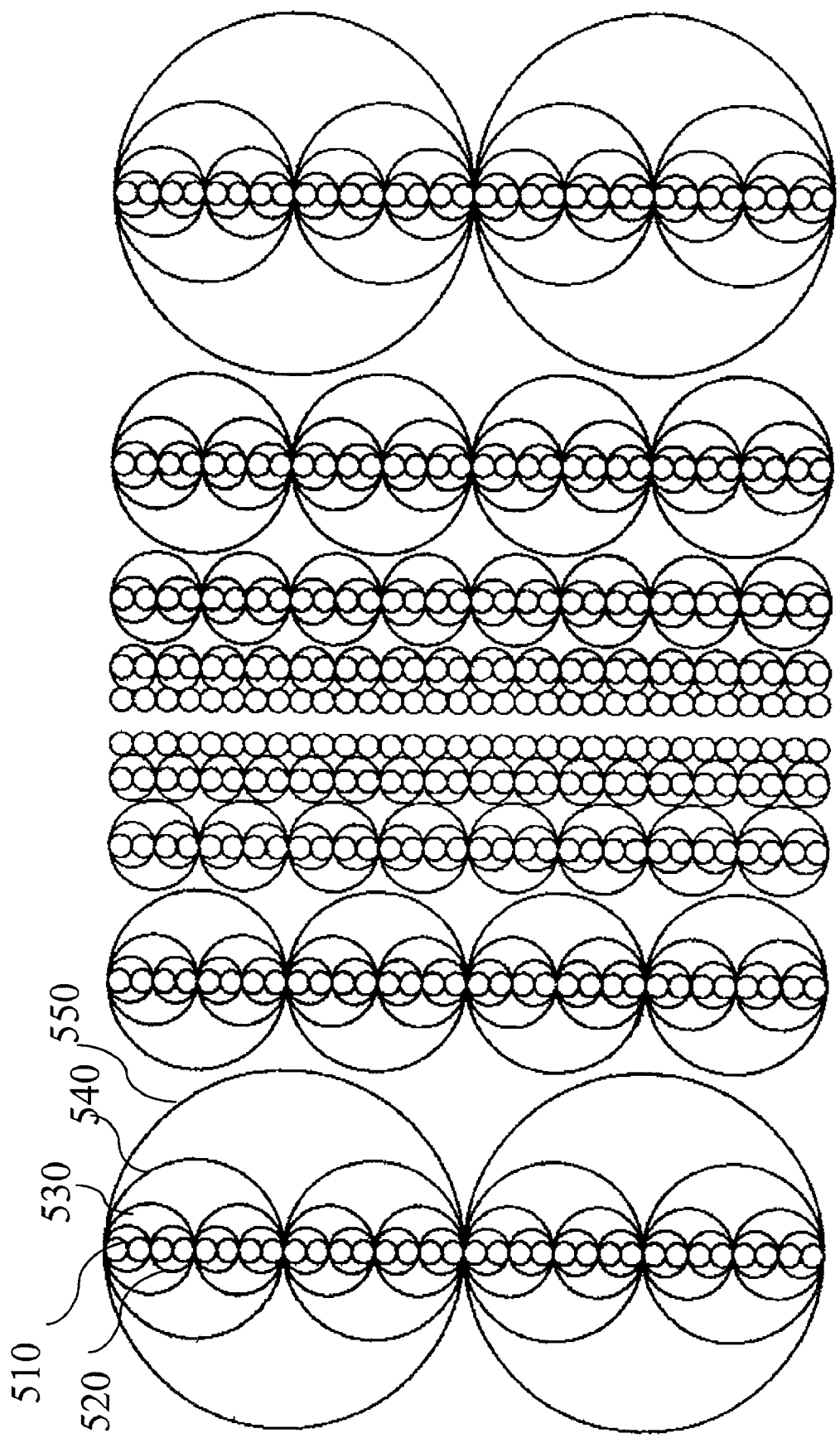
FIG. 5. Empirical Method. Diagram of Nested Cylinder tread—end view, showing five cylinder sizes.
Figure 6:
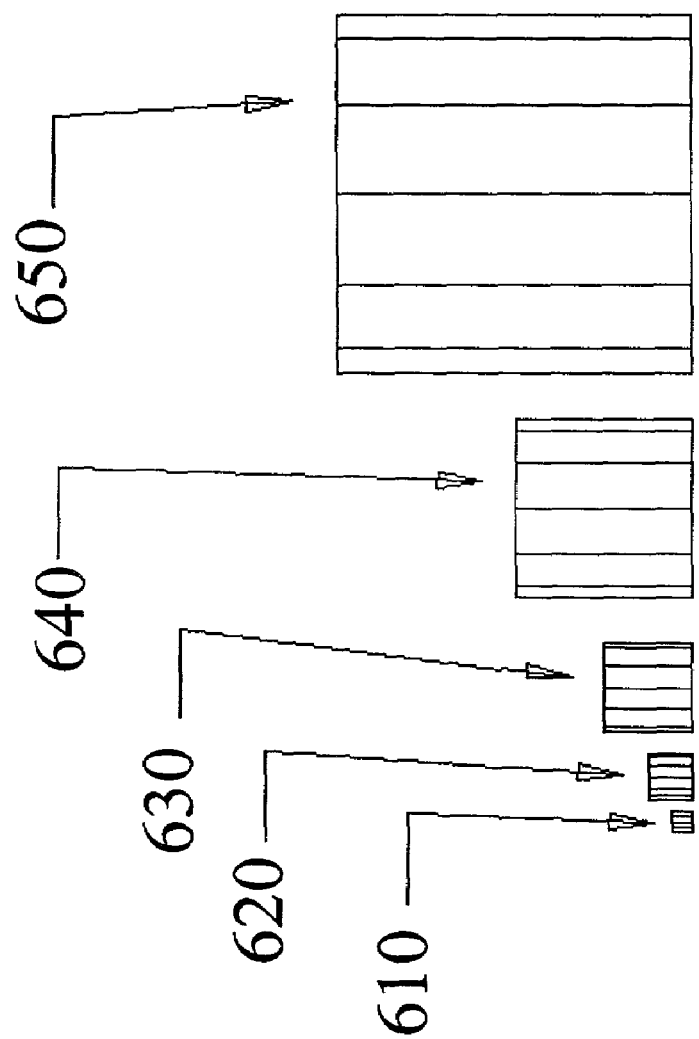
FIG. 6. Empirical Method. Diagram of Nested Cylinder tread—cross section, showing relative vertical dimensions of cylinders.

FIG. 5 and FIG. 6 show end and cross-section views of nested cylindrical tread elements respectively. Examples of cylindrical elements of increasing diameters are represented by 510, 520, 530, 540, and 550 in FIG. 5, where each diameter in this increasing series is twice that of the next smaller diameter. A cross-section showing the relative heights of these elements is shown in FIG. 6.

Generate a Tread Design which Incorporates the Repeating Pattern

Figure 7:
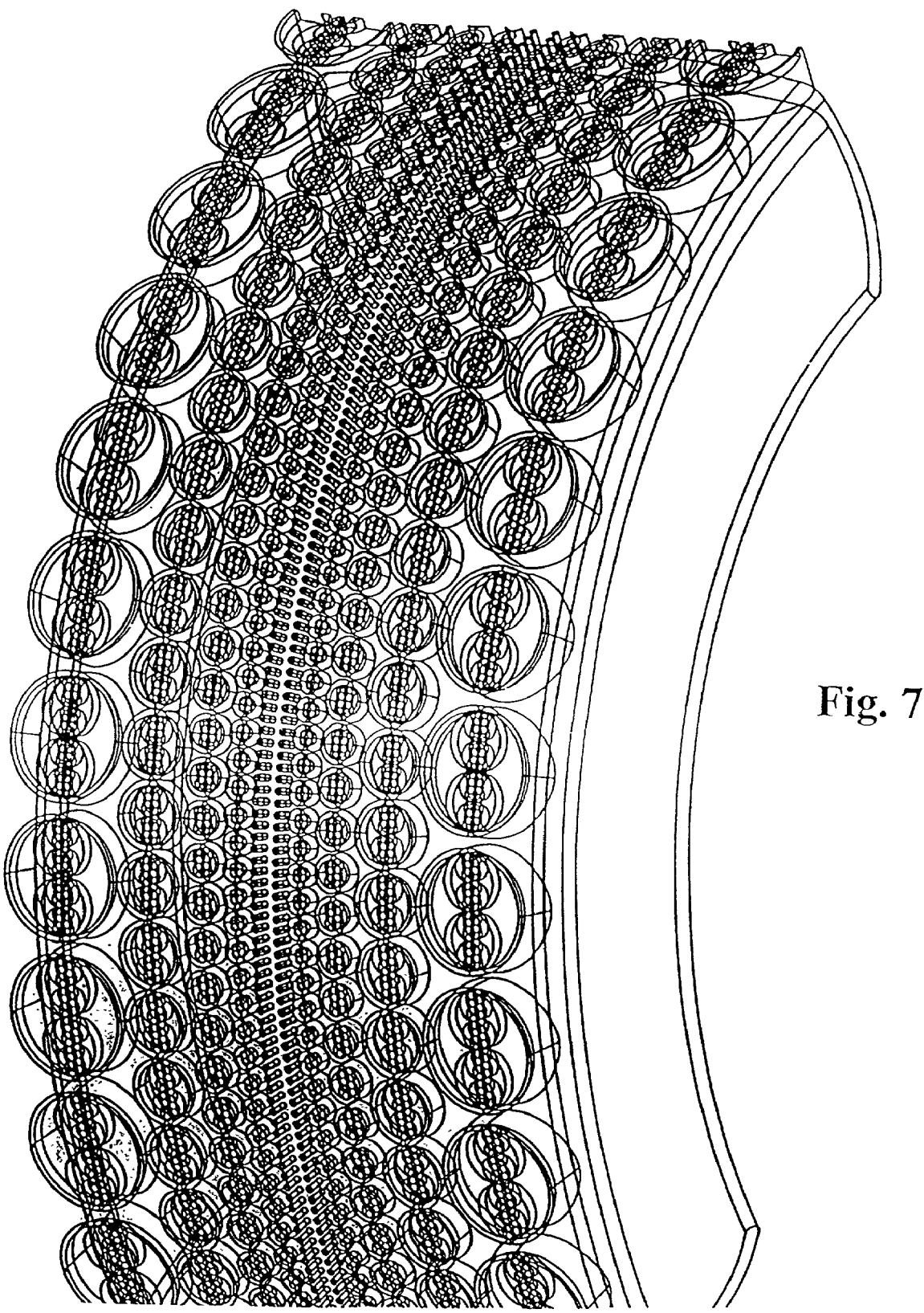
FIG. 7. Empirical Method. Diagram of Nested Cylinder tread in section of tire (wire frame).

Given the selection of cylinders for the tread design, having a plurality of protuberances ranging over doublings in the horizontal plane from 0.5 mm diameter to 16 mm diameter, the tread pattern can then be generated for the surface of the design. Because the size range in this case includes six cylinder sizes we generate a pattern, wherein rows of cylinders are generated, encompassing protuberances of six different cylinder sizes, the ends of which have circular shape with diameters as stated, 0.5 mm, 1.0 mm, 2.0 mm, 4.0 mm, 8.0 mm, and 16.0 mm. FIG. 7 shows an example tire tread having cylindrical elements of six sizes.

The row of protuberances being cylinders having end diameter 0.5 mm are adjacent to a row protuberances being cylinders having end diameter 1.0 mm. The row of protuberances being cylinders having end diameter 1.0 mm are adjacent to a row of protuberances being cylinders having end diameter 2.0 mm. The row of protuberances being cylinders having end diameter 2.0 mm are adjacent to a row of protuberances being cylinders having end diameter 4.0 mm. The row of protuberances being cylinders having end diameter 4.0 mm are adjacent to a row of protuberances being cylinders having end diameter 8.0 mm. The row of protuberances being cylinders having end diameter 8.0 mm are adjacent to a row of protuberances being cylinders having end diameter 16.0 mm. In addition, each cylinder is nested within the next largest size cylinder as well as being adjacent to the next largest cylinder. The smallest cylinders have been drawn nested within the next largest cylinder. Given the set of cylinder sizes developed above, the pattern on the tread surface and the spatial relations describing the pattern can be either empirically or analytically derived, this pattern is but one example. In addition, the relative height of each protuberance from the tread surface can be either empirically determined or the result of a similar analytical determination.

EXAMPLE A2

Vertical Plane

Select a Surface Intended for Contact with the Tread to be Designed—Vertical Plane In this Example A2, we select pebbles and voids in the same roadway as in Example A1 wherein the pebbles range in height from 0.25 to 2 mm from the top surface.

Characterize the Substrate Topography—Vertical Plane

In this General Tread Design Example A2, by choosing substrate having a specific range of sizes, namely, ranging in height from 0.25 to 2 mm from the top surface, we characterize the substrate in the vertical plane. We choose these dimensions as an ideal case for the purpose of discussion; for the empirical and analytical method, these dimensions would be measured. As will be shown in further steps of the General method, we will utilize these pebble dimensions (dimensions of the substrate) to perform calculations for which to determine a tread design pattern which corrresponds to the specific dimensions of the substrate topography.

Selecting a Repeating Pattern Having Fractal Characteristics Corresponding to the Topography of the Surface Substrate—Vertical Plane If, for example, the pebbles and voids in the same roadway as in the aforementioned example range in height from 0.25 to 2 mm from the top surface, the tread would be designed with vertical dimensions of the cylinders from the contact surface of 0.125, 0.25, 0.5, 1, 2 and 4 mm. The relative proportions of pebbles and voids of each diameter and height in the roadway surface would determine the relative proportions of protuberances and voids in each category.

Generate a Tread Design which Incorporates the Repeating Pattern—Vertical Plane

For each of the 6 sets of cylinder shaped protuberances the vertical dimensions of the cylinders from the contact surface will be 0.125 mm, 0.25 mm, 0.5 mm, 1 mm, 2 mm and 4 mm.

Empirical and Analytical Methods

The design method according to the present invention may be further characterized by empirical and analytical embodiments.

Empirical Tread Design Method

Figure 2:
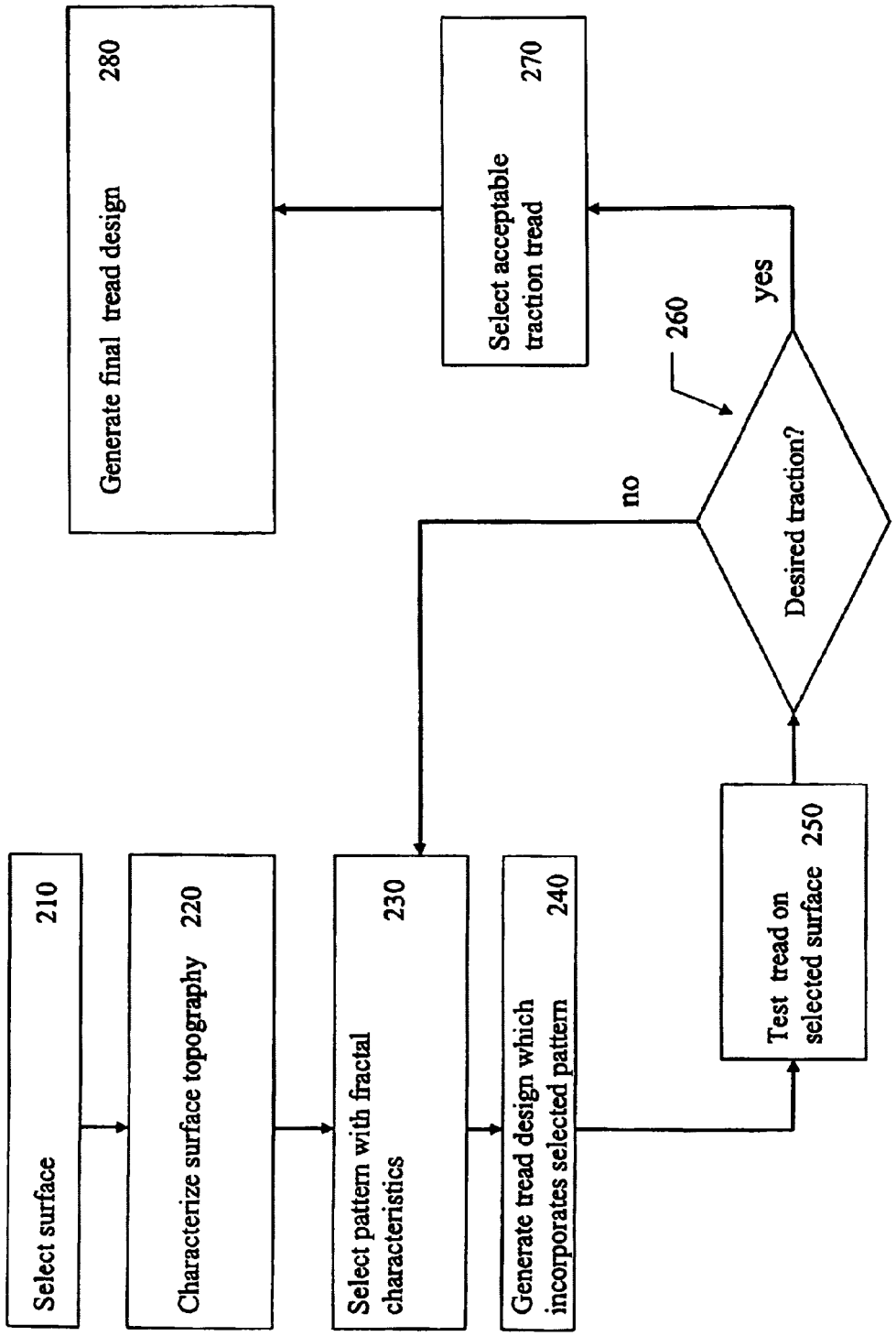
FIG. 2. Flow diagram showing empirical fractal tread design.

As shown in the flowchart of FIG. 2, the empirical tread design method according to the present invention is primarily characterized by:

Selecting a surface intended for contact with the tread to be designed 210, including identifying acceptable traction between tread and surface;
Characterizing the topography of the surface 220, including measuring the intended substrate surface;
Selecting a pattern having fractal characteristics 230
Generating a tread design which incorporates a selected pattern 240;
Testing the tread on the selected surface 250;
If traction is at least the identified acceptable traction, go to the next step(selecting a tread design 270); otherwise (else) iteratively repeat the previous steps of selecting a pattern 230, generating a tread design 240, testing the tread 250 until traction is acceptable 260;
Selecting a tread design having acceptable traction 270; and
Generating a final tread design incorporating the selected pattern 280.

Figure 2A:
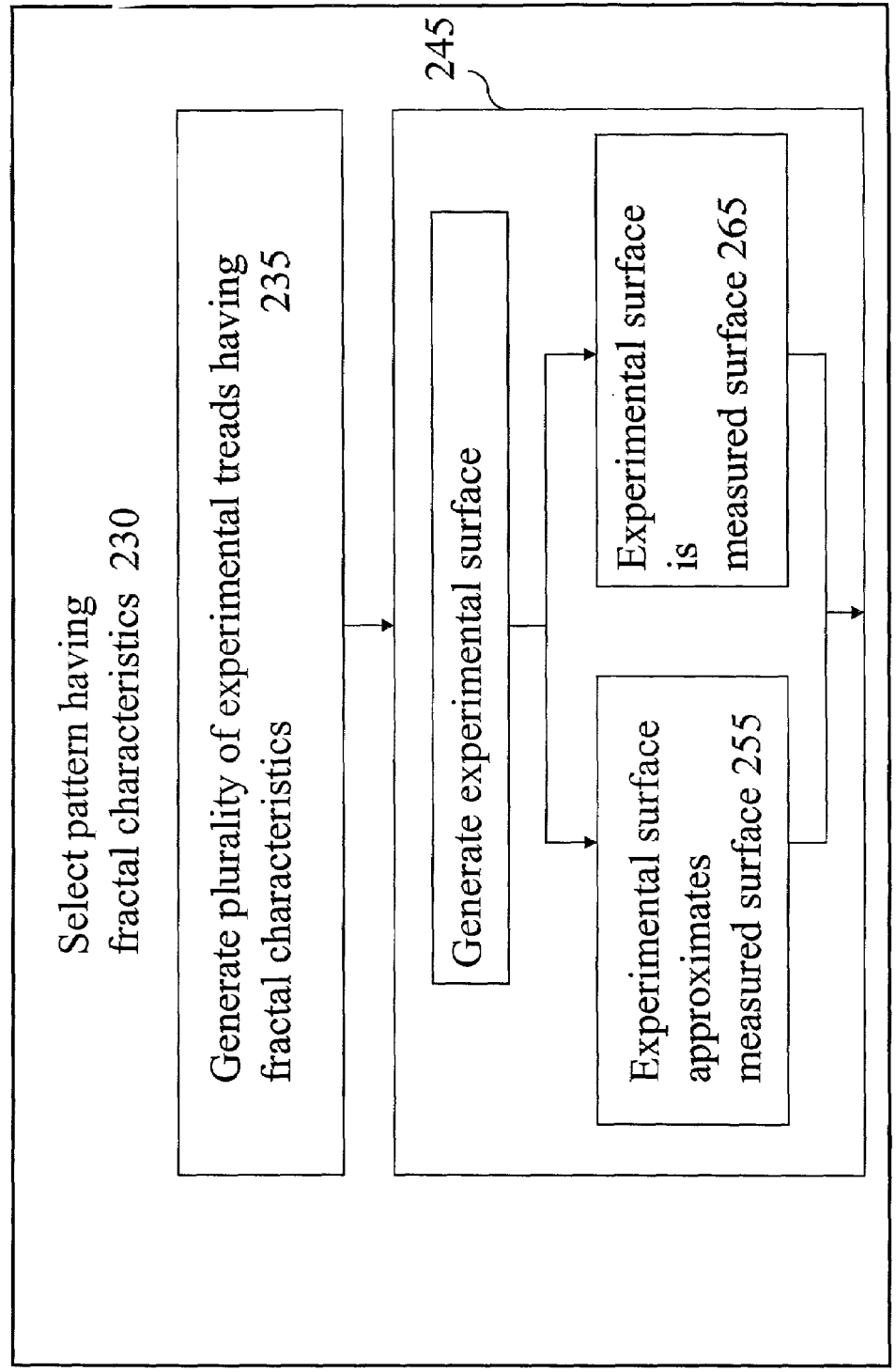
FIG. 2A. Flow diagram showing empirical fractal tread design—substeps of 230.

In the above, shown in more detail in FIG. 2A, the step of

Selecting a pattern having fractal characteristics 230 contains the substeps
Generate a plurality of experimental treads having fractal characteristics 235 and
Generate an experimental surface 245 which approximates 255 or is the measured surface 265.

To further describe the above, in some embodiments, the experimental surface against which the tread is tested, can be an approximation of the pattern of the substrate for which the tread is intended to be used. In other embodiments, the experimental surface can be an example of the actual substrate against which the tread is intended to be used. The more closely the pattern of the tread to be designed matches the pattern of the intended substrate, the better the fit between the tread and the substrate.

EXAMPLES B

Empirical Tread Design Method

As shown above, the steps in the Empirical Tread Design method are:
Select a surface intended for contact with the tread to be designed;
Characterize the substrate topography;
Select a repeating pattern having fractal characteristics;
Generate a tread design which incorporates the repeating pattern;
Test Tread on selected surface;
If the traction is at least the acceptable traction, then
Select an acceptable traction tread;
else iteratively repeat the steps to
Select a repeating pattern having fractal characteristics;
Generate a tread design which incorporates the repeating pattern;
Test the tread on selected surface;
until the traction is acceptable;
Select an acceptable traction tread;
Generate a final tread design.

EXAMPLE B1

Empirical Method

Select a Surface Intended for Contact with the Tread to be Designed

For this Empirical Tread Design embodiment (Example B1) we selected a sand substrate.

Characterize the Substrate Topography

Measure the Intended Substrate Surface

The simulated substrate was a cleaned, screened quartz sand with particle diameters between 0.5 and 1.25 mm. We determined the size of the sand particles by using sand which had been previously screened through particle screening devices of fixed size.

Select a Repeating Pattern Having Fractal Characteristics

Generate a Tread Design which Incorporates the Repeating Pattern

The following is an example of the application of the empirical method of this invention to develop, design and test a tread pattern for a tire used in sand The test assemblies are then dragged across the simulated subsurface by the harness. The design to be tested is attached to the base surface comprised of a series of cone shapes each being half the size of the row preceding it.

The treads tested in this example were based on the Sierpinski Fractal, a named fractal formed by nested equilateral triangles. The dimensions of the triangles attached to the tire tread base represent doublings from each set to the next. Diagrams of cone-shaped tread are shown in top and perspective views (FIG. 4A, FIG. 4B).In FIGS. 4A and 4B, three sizes of cones are depicted (410,420,430). The smallest size cone, an example of which (430) has a base whose diameter is one-half the diameter of the base of next size cone, an example of which is 420. This cone (420) in turn has a base whose diameter is one-half the diameter of the largest cone shown, an example of which is 410. In FIG. 4B, which shows these cones in perspective wire frame view, an example of the smallest cone is 410, an example of the next size cone is 420, and an example of the largest cone is 430.

The sets of fractal triangles mounted in dimensional order each set half the dimensions of the previous, were mounted on a roller which simulates a wheel with the triangles representing a tread simulation.

Empirical Tread

An elastomeric sheet material with a thickness of 0.5 mm was chosen as the surface material for the experimental tire. Four experimental tire tread designs were prepared as follows: Each experimental tire tread was constructed on a 10 cm diameter cylindrical base, covered on the outside with the tread design to be tested. Inside the cylinder was placed a concentric 5.0 Kg cylindrical weight with attachments for a harness. The treads selected in this experiment were as follows:

Treads a, b, c and d a) A tread with the wheel circumference covered by an uninterrupted sheet of elastomer;

b) A tread such as (a) with additional layers of equilateral triangles with a base length equal to the width of the tire, c) A tread such as (b) with an additional layer of nested equilateral triangles with a base length equal to one half the width of the tire, and d) A tread such as (c) with an additional layer of nested equilateral triangles with a base length equal to one quarter of the width of the tire.

Test Bed to Measure Friction

A test bed 12 cm wide, 10 cm deep and 1.2 meters long was constructed and filled with the above sand to a depth of 5 cm. In the center of the circular test roller, a cylindrical weight is placed to study the tread behavior under a variety of loading conditions. The test bed, a rectangular-shaped trough was formed containing the simulated subsurface. This may be changed to provide evidence of adherence for a variety of subsurface materials. The vertical members comprise a trough containing the subsurface test material. The roller mechanism, with the simulated tread design attached, is dragged in the direction by the harness mechanism. Rolling is prevented by the harness assembly, to ensure that the measured force is exclusively due to friction between the tread and substrate. A strain gauge was inserted in the harness string and recorded the force level when the tread slides across the substrate by applying force. This test was repeated with a variety of treads, and a variety of subsurfaces to compare the adhesion, one to the other, along the test bed.

Test Tread on Selected Surface

Repeat Process

Select pattern having fractal characteristics; Generate design; Test tread

Measure the Friction Between Substrate Surface and Treads

To measure the friction of each tread design in the bed of sand a horizontal force was applied in the rolling direction, through a calibrated linear spring force gauge attached to the simulated test wheel by the harness. This force was increased slowly until the wheel broke traction and skidded in the sand. Rotation was prevented, and the gross contact area between the tread and the sand was held constant for all treads tested. Multiple measurements were taken and averaged to obtain the frictional resistance offered by each tread design. In treads (b), (c) and (d), the area of the elastomeric triangular protuberances equaled the area of similarly sized depressions in the tread surface. The test was performed multiple times in dry sand, and in sand with 10% volume of water added. The wet sand had a hard paste-like consistency quite unlike the free-flowing consistency of the dry sand.

The Traction Force is the force required to break friction in each case, and was as follows:

| Tread | Dry Sand Traction Force (Kg) | Wet Sand Traction Force (Kg) |
|---|---|---|
| (a) | 1.6 | 2.9 |
| (b) | 1.7 | 3.7 |
| (c) | 1.7 | 3.8 |
| (d) | 2.0 | 3.9 |

The gross improvement in traction resulting from the added layers of cylinders in the tread were as:

| | |
|---|---|
| $(2.0/1.6) \times 100 = 125.0\%$ improvement | $(3.9/2.9) \times 100 = 134.5\%$ improvement |

Select an Acceptable Traction Tread

In this example, treads with fractal designs covered a range of 4-times or 2 doublings of the linear dimension. The improvement in tracking force by using a design having fractal characteristics was 125% for a dry sand substrate and 134.5% for wet sand, resulting in our selecting to use this type of design over the others tested. Both conditions of the substrate significantly benefited from the application of the method of the present invention.

Generate a Final Tread Design which Incorporates the Repeating Pattern

Based upon the results stated above, we selected an acceptable traction tread design which incorporated the selected pattern to be generated.

EXAMPLE B2

Empirical Method

Select a Surface Intended for Contact with the Tread to be Designed

For this Empirical Tread Design Example B2, we selected a sand substrate.

Characterize the Substrate Topography

Measure the intended substrate surface

The sand used was the same substrate as in Example B1, cleaned, screened quartz sand with particle diameters between 0.5 and 1.25 mm. We determined the size of the sand particles by using sand which had been previously screened through particle screening devices of fixed size.

Select a Repeating Pattern Having Fractal Characteristics

Generate a Tread Design which Incorporates the Repeating Pattern

Empirical tread formed with sipes in the pattern of the "H", dendron tree, a named fractal that is formed by successively branched lines.

The test surface used in Example B2 was the same to that used in Example B1. The use of sipes in tread design is particularly appropriate for relatively smooth substrate surfaces; at each step of the fractal development, additional orthogonal branches are added with line lengths equal to one-half the line length used in the previous step.

Test Tread on Selected Surface

Repeat Process

Select pattern having fractal characteristics; Generate design; Test tread

Measure the friction between test substrate surface and treads

Measurements of traction force made, on a similar experimental plan as in Example 1 but with a tread formed with sipes in the pattern of the "H", dendron or tree, a named fractal that is formed by successively branched lines. These treads were tested on wet and dry surfaces with surface irregularities ranging from 0.01 to 0.10 mm. With this series of treads, fractal designs with the greatest degree of fractal development had the greatest traction force. Under dry conditions the enhancement caused by a fractal design with a range of pattern dimension of twice the linear dimension was 125%, and under wet conditions the enhancement was 115%.

Select an Acceptable Traction Tread

As shown in the above table, the tread having fractal characteristic patterns resulted in greater traction force and would be selected over the others tested.

Generate a Final Tread Design

Based upon the above results, a tread design incorporating the selected pattern would be generated.

EXAMPLE B3

Tread Pattern Adapted for Use in Snow

Select a Surface Intended for Contact with the Tread to be Designed

For this Empirical Tread Design Example B3 we selected a snow substrate.

Characterize the Substrate Topography

Measure the Intended Substrate Surface

Snow at a temperature of −4 degrees C. was used for these experiments. Firstly, the natural conical angle of the snow was measured to be 98 degrees (±3). An aspect of the present invention is the use of measured characteristics of the substrate material in the design of the tread.

Select a Repeating Pattern Having Fractal Characteristics

Generate a Tread Design which Incorporates the Repeating Pattern

Empirical Tread

The traction surfaces tested in this example were based on a simplified fractal based on cones with a conical angle of 98 degrees. The traction surfaces tested in this experiment were as follows:

(a) A traction surface with the sled base being uninterrupted, (b) A traction surface with a layer of cones with a height of 10 mm, (c) A traction surface such as (b) with an additional set of cones with a height of 20 mm, and (d) A traction surface such as (c) with an additional layer of cones with a height of 40 mm.

In this way, a power series of cones formed the traction surface. The heights formed a power series (10, 20 and 40 mm), and the relative frequencies of occurrence also formed a power series (4:2:1). The arrangement of cones provided approximately equal surface areas on the base for each size class of cone, and the voids between the cones formed an angle of 98 degrees between conical surfaces.

Test Tread on Selected Surface

Repeat Process

Select Pattern Having Fractal Characteristics; Generate Design; Test Tread

Natural powder snow at a temperature of −4 degrees C. was used for these experiments. First, the natural conical angle of the snow was measured to be 98 degrees (±3). For simplicity of design, the protuberances on the traction surface were conical in shape, and had a conical angle of 98 degrees. In this case, the conical angle of a naturally formed pile of the snow was used as the shape of the fractal pattern in the design of the fractal tread. This conical angle is a measure of the cohesiveness of any given particulate material. The use of this angle in the design of cleats and voids of the tread enhances the formation and compaction of clods of the loose material, which then form temporary protuberances in the substrate as focal points for traction. Clods having this natural conical angle are appropriate for the voids in the tread pattern for this purpose.

This experiment was performed as follows; a test bed 50 cm wide, 10 cm deep and 2.5 m long was constructed and filled with the aforesaid snow to a depth of 10 cm. Each experimental traction surface was constructed on the base of a 14×50-cm sled. The front of the sled consisted of a cylindrical surface 10 cm in diameter, to prevent lodging of the sled in the snow. The front of the sled had an attachment point for a harness on its upper surface. To measure the friction of each traction surface design against the bed of snow, a horizontal force was applied in the forward direction, through a calibrated linear spring gauge attached to the test sled by the harness. This measured force was increased slowly until the sled broke traction and skidded in the snow. Multiple measurements were taken and averaged to obtain the frictional resistance offered by each traction surface design.

The traction surfaces tested in this example were based on a simplified fractal based on cones with a conical angle of 98 degrees. The traction surfaces tested in this experiment were as follows: (a) A traction surface with the sled base being uninterrupted, (b) A traction surface with a layer of cones with a height of 10 mm, (c) A traction surface such as (b) with an additional set of cones with a height of 20 mm, and (d) a traction surface such as (c) with an additional layer of cones with a height of 40 mm. In this way, a power series of cones formed the traction surface. The heights formed a power series (10, 20 and 40 mm), and the relative frequencies of occurrence also formed a power series (4:2:1). The arrangement of cones provided approximately equal surface areas on the base for each size class of cone, and the voids between the cones formed an angle of 98 degrees between conical surfaces.

In order to gain assurance from random errors the test was performed multiple times in loosely compacted snow and the results averaged. Following each test run, the snow was raked and compacted to similar density. Tests were then run on the alternate tread designs. The Traction Force results are those required to break friction and maintain a forward rate of motion of about 6 meters/minute; these tests resulted in the following:

| Traction Surface | Traction in Snow Force (N) | Relative Traction Force (%) |
| --- | --- | --- |
| (a) | 6.2 | 100 |
| (b) | 12.2 | 197 |
| (c) | 14.8 | 239 |
| (d) | 16.8 | 271 |

Select an Acceptable Traction Tread

In this experiment, (d) a traction surface with an additional layer of cones translating to a power series of cones and thus a traction surface having fractal characteristics formed the traction surface which resulted in the highest friction measured.

Generate a Final Tread Design

Based upon the above results, a tread design incorporating the selected pattern would be generated.

EXAMPLE B4

Particles of Known Size Paired with Treads of Similar Sizes

Select a Surface Intended for Contact with the Tread to be Designed

For this Empirical Tread Design embodiment (Example B4) we selected particles of fixed size, aluminum oxide as both tread and substrate.

Characterize the Substrate Topography

Measure the Intended Substrate Surface

For this experiment substrates with fixed aluminum oxide particles of known size, with the particles nearly monodispersed, were paired with treads of similar sizes, and the traction force was measured.

Select a Repeating Pattern Having Fractal Characteristics

Generate a Tread Design which Incorporates the Repeating Pattern

The treads used were similar to the above empirical method Example B3.

Test Tread on Selected Surface

Repeat Process

Select Pattern Having Fractal Characteristics; Generate Design; Test Tread

The test bed used was the same as in the above examples, using aluminum oxide particles of known size for the substrate. In this experiment the protuberance size and distribution on the tread were fabricated to match distribution of the substrate. For this experiment substrates with fixed aluminum oxide particles of known size were paired with treads of similar sizes, and the traction force was measured. The testing methodology used was similar to the above examples, with the particles nearly monodispersed; the results are as follows (particle size is in Mesh, force is in Newtons):

(Particle Size, tread = row, substrate = column)

| | Substrate particle size | | | |
| --- | --- | --- | --- | --- |
| | 600 | 240 | 150 | 60 |
| Tread Particle size | | Force | | |
| 600 | 24 | 21 | 8.6 | 16 |
| 240 | | 20 | 18 | 16.5 |
| 150 | | | 19 | 14 |
| 60 | | | | 17 |

Select an Acceptable Traction Tread

As shown in the above table, it is clear that matched patterns of the tread and substrate generally result in greater traction force. This result reinforces the principle that having substrate and tread patterns match results in the greatest friction.

Generate a Tread Design which Incorporates the Repeating Pattern

Based upon the above results, a tread design incorporating the selected pattern would be generated.

EXAMPLE B5

Select a Surface Intended for Contact with the Tread to be Designed

For this Empirical Tread Design embodiment (Example B5) we selected particles of uniformly varied size, aluminum oxide substrate.

Characterize the Substrate Topography

Measure the Intended Substrate Surface

This experiment was performed with the number of particle sizes in the substrate inversely proportional to the particle diameters. Using the same test fixture this mixture had particles size of 600, 240, 150, and 80 mesh in the proportions of 10:4:2.5:1, by weight. The substrate was made from the mixture; four treads tested were made from the individual mesh size, and the fifth from the mixture.

Select a Repeating Pattern Having Fractal Characteristics

Generate a Tread Design which Incorporates the Repeating Pattern

The treads used were similar to the above empirical method Example B4.

Generate a Test Substrate Surface

The best bed used was the same as in the above examples, using aluminum oxide particles for the substrate.

Test Tread on Selected Surface

Repeat Process

Select Pattern Having Fractal Characteristics; Generate Design; Test Tread

| Tread Particle Size (Mesh) | Traction Force (N) vs. substrate Mixture |
| --- | --- |
| 600 | 21 |
| 240 | 20 |
| 150 | 18 |

-continued

| Tread Particle Size (Mesh) | Traction Force (N) vs. substrate Mixture |
|---|---|
| 60 | 16 |
| Mixture | 22 |

Select an Acceptable Traction Tread;

As shown in the above table, it is clear that matched patterns of the tread and substrate result in greater traction force.

Generate a Final Tread Design.

Based upon the above results, a tread design incorporating the selected pattern would be generated.

These results demonstrate clearly that matching the size and frequency of occurrence of protuberances of the tread to the substrate, improves traction. The mixture used in the tread design most closely matched to the substrate characteristics provided the greatest traction force.

A similar procedure could be performed with an appropriate determination of the radial distribution for the variations in the surface of the substrate. The radial distribution pattern gives not only the particle size distribution, but also the spatial distribution of the particles. With this method, traction surfaces can be designed with greater precision to improve traction on any substrate surfaces.

Analytical Tread Design Method

Figure 3:
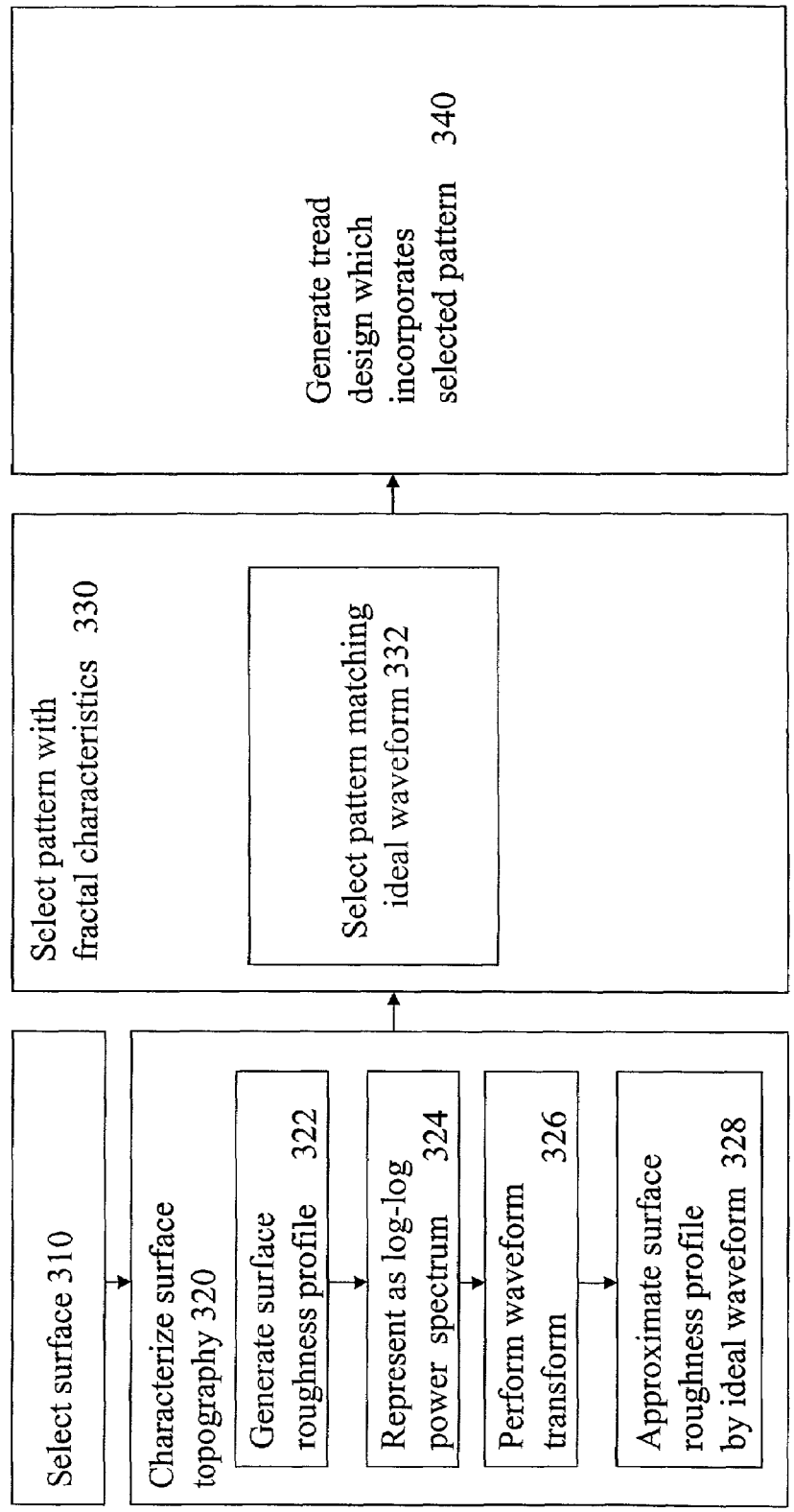
FIG. 3. Flow diagram showing analytical fractal tread design.

As shown in the flowchart of FIG. 3, the general tread design method according to the present invention is primarily characterized by:
select a surface 310, then to
characterize the topography of the surface 320, comprising substeps to:
  generate a surface roughness profile 322
  represent the topography as a log-log power spectrum 324;
  subject the power spectrum to a log transform 326;
  approximate the log transform by an ideal waveform 328;
select a pattern with fractal characteristics appropriate to the topography of the surface 330, comprising substeps to:
select a pattern matching the ideal waveform 332;
generate a tread design which incorporates the selected pattern 340.

EXAMPLE C

Analytical Tread Design Method—Nested Spherical Protuberances

In this Example C, the analytical method was used to design a tread.

Select a Surface Intended for Contact with the Tread to be Designed

For this Analytical Tread Design Example C, we selected particles similar in nature to an aggregate based road surface (gravel) substrate.

Figure 8:
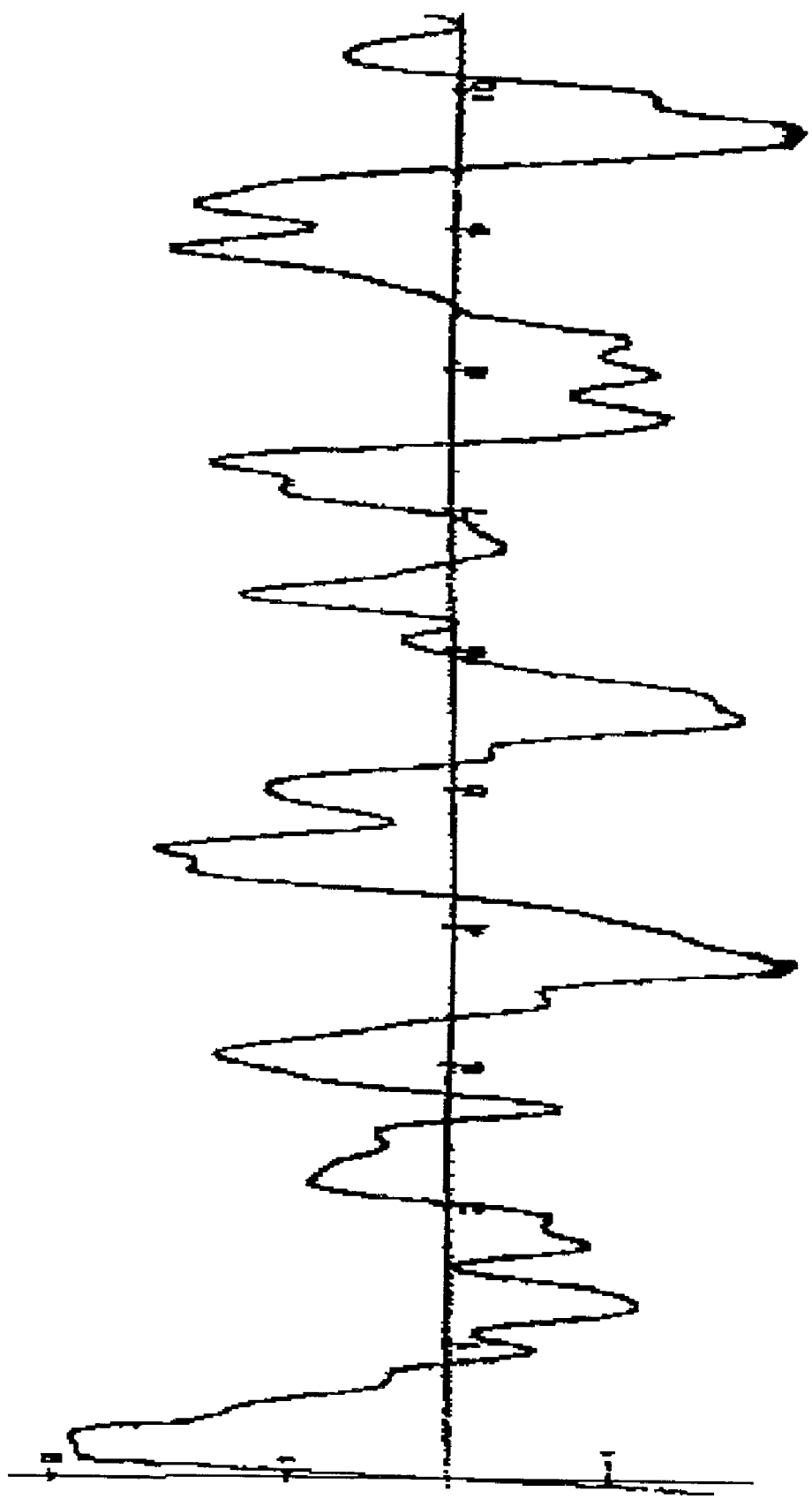
FIG. 8. Analytical Method. Surface Roughness Profile.

Characterize the Topography of the Surface;

Generate a Surface Roughness Profile;

The starting point in the design process is to make a surface roughness profile giving the vertical displacement of the substrate surface as a function of linear distance along the surface. The surface roughness profile result was obtained for an isotropic substrate surface similar in nature to an aggregate based road surface. FIG. 8 shows an example of a surface roughness profile. This represents a gravel road substrate. The gravel shows a series of heights and valleys in the surface roughness profile of the substrate. This dimensional data is then subjected to (1) characterization of the substrate topography and then is reduced to an equivalent fractal geometry with matching ranges of scales and special distribution.

Represent the Profile Topography as a Log-log Power Spectrum;

Subject the Power Spectrum to a Logarithmic Transformation;

The surface roughness profile was digitized, and the logarithms were taken.

Approximate the Log Transform by an Ideal Waveform

Figure 9:
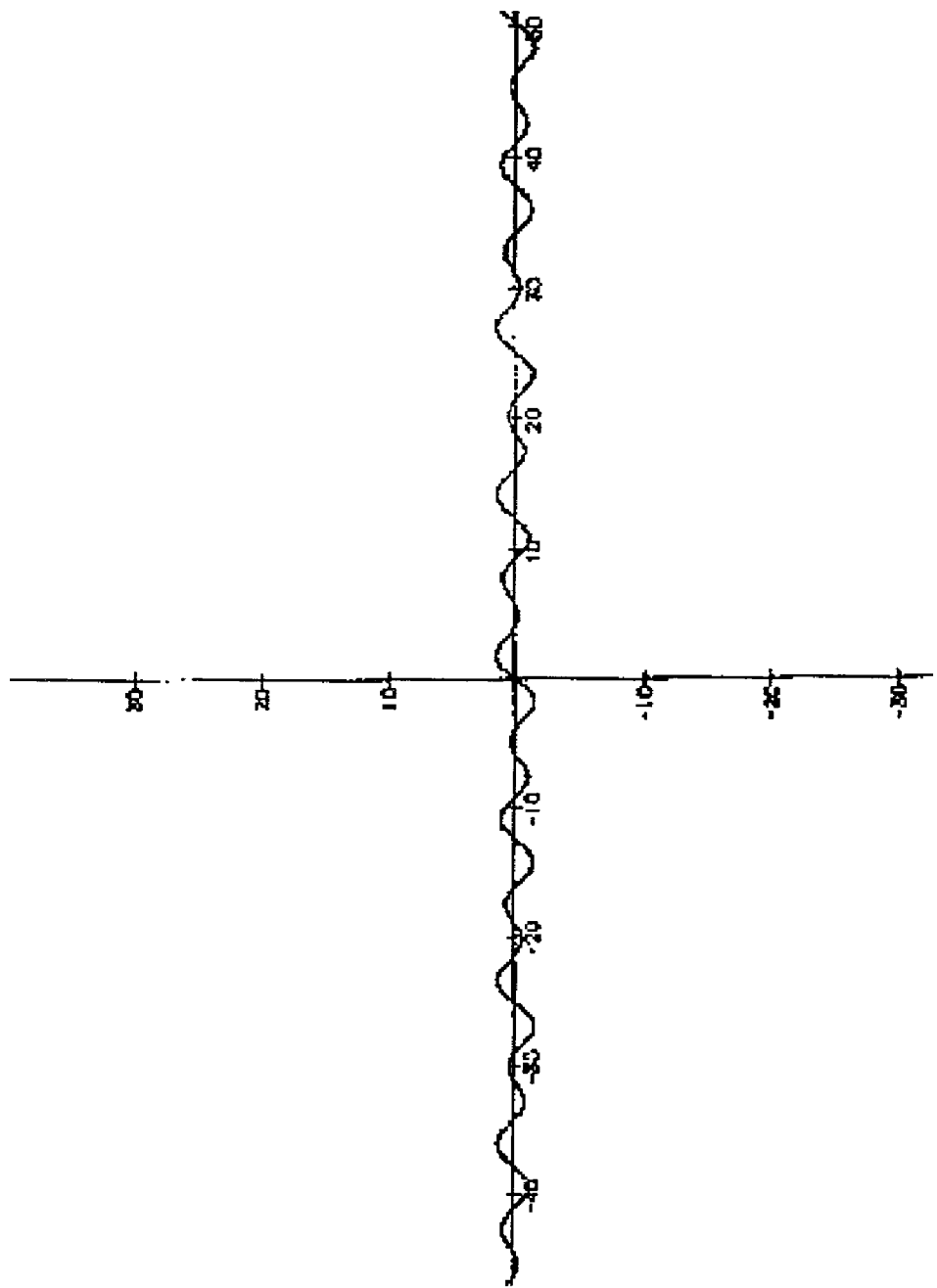
FIG. 9. Analytical Method. Diagram of Fourier Transform.

After the surface roughness profile was digitized, and the logarithms taken as described above, the plot was subjected to a Fourier analysis such that the output was restricted to a power series of sinusoids. FIG. 9 shows a diagram of a Fourier transform for the surface profile of FIG. 8. Such a series has fractal characteristics: it is self-similar over a power series spanning several doublings. The result of the Fourier transform is, a model of the surface roughness profile of the actual substrate, having its main characteristics, but lacking some aspects of randomness and lacking some features that occur infrequently on the surface. The Fourier transform procedure reduces a complex measured 'waveform' into a sinusoidal equation that simulates the characteristics of the measured waveform. The measured waveform is a measurement of the variation in the height (or z) dimension with distance along either the width (x) or depth (y) dimensions (both would give equivalent results). A natural consequence of the analytical technique is that it results in a sinusoidal function with fractal characteristics in both the x, y and z dimensions. The result of the Fourier analysis of the surface roughness profile was as follows:

$$Y=\sin X+(0.5)\sin(X/2)+(0.25)\sin(X/4)+(0.125)\sin(X/8)+(0.063)\sin(X/16)$$

where:

Y=Vertical displacement at any given location in the profile

X=Horizontal displacement from an arbitrary starting point on the surface

Figure 10:
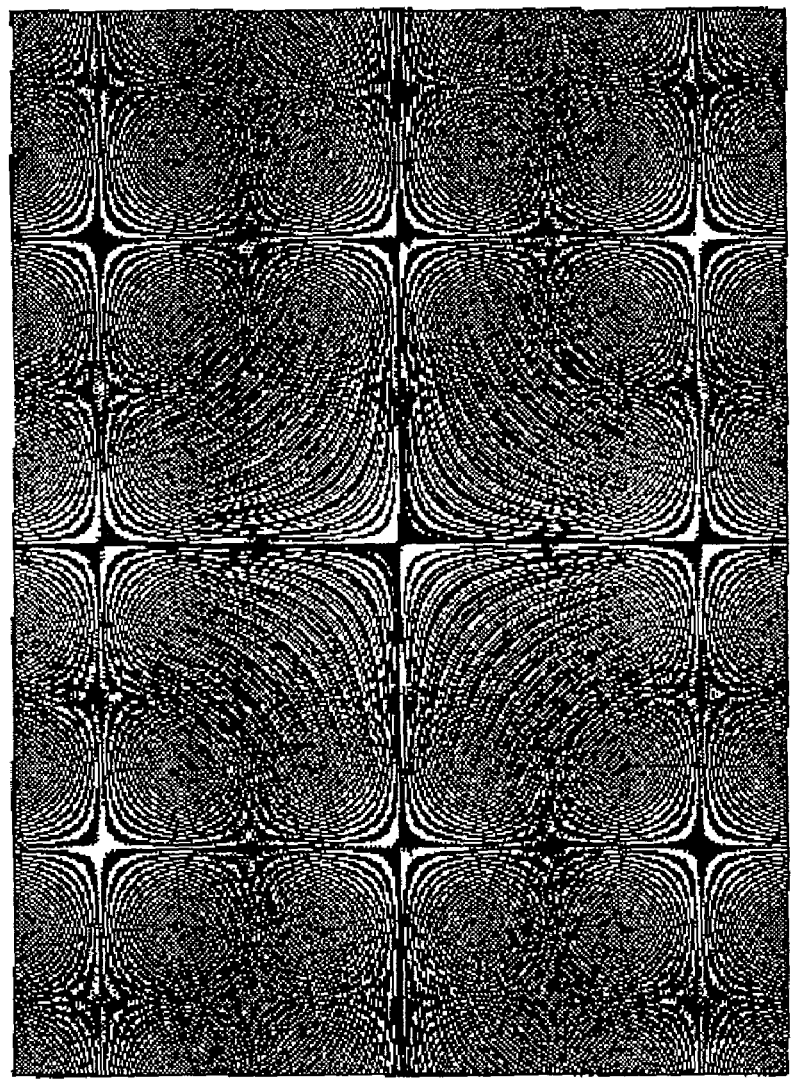
FIG. 10. Analytical Method. Fourier Plot, Surface Roughness over large length span.
Figure 11:
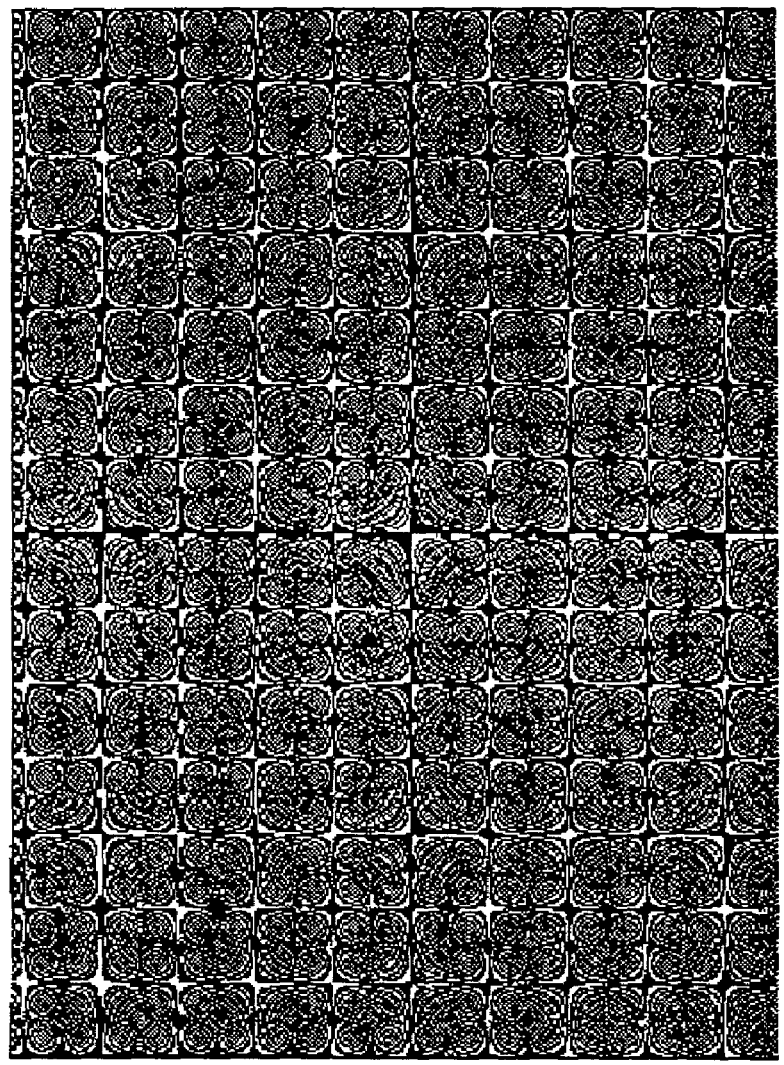
FIG. 11. Analytical Method. Fourier Plot, Surface Roughness over 1/10 FIG. 10 length span.
Figure 12:
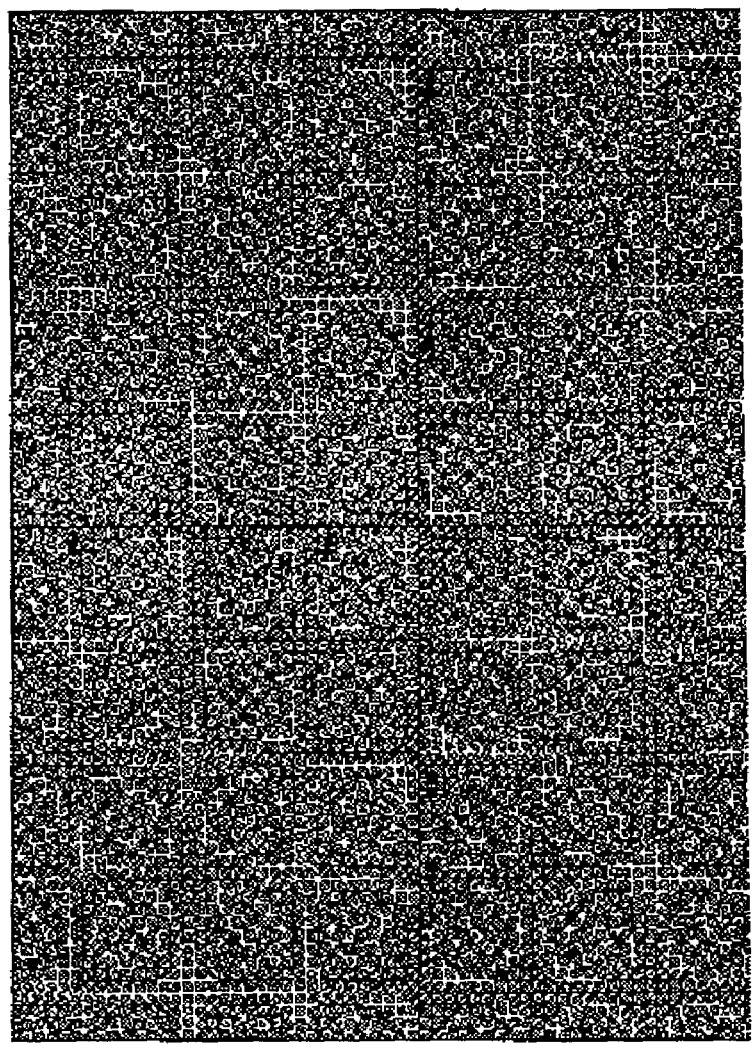
FIG. 12. Analytical Method. Fourier Plot, Surface Roughness over 1/20 FIG. 10 length span.

Selecting a Tread Pattern Having Fractal Characteristics;

Select a Pattern Matching the Ideal Waveform;

This result above was used to calculate the Fractal Tread surface. A plot of the surface over a large length span is given in FIG. 10. The scale independent nature of the Fractal Tread pattern is evident from FIG. 10: there are very small protuberances, medium sized protuberances and larger undulations in the surface. FIG. 11 gives a plot of the tread surface over a length span $1/10^{th}$ the span shown in FIG. 10, and FIG. 12 gives a plot of the tread surface over a length span $1/20^{th}$ the span shown in FIG. 10. The self-similarity over a wide range of scales is evident from these figures of the identical tread at widely different scales of observation. Each size scale of the Fractal Tread corresponds to a similar size scale of protuberance or depression in the original substrate material. Moire patterns formed by the interaction of the tread motif recurring at different scales results in an additional and unexpected series of complex ridges and undulations, similar in appearance to a fingerprint, and further enhancing the traction of the Fractal Tread on the substrate.

Generate a Tread Design Incorporating the Selected Pattern

In addition, the same surface was used to develop a similar Fractal Tread using the empirical method. In this instance, nested spherical protrusions were used to provide a fractal tread appropriate to the same surface characterized by the surface roughness profile described and the Fourier analysis given above. The result of this empirically determined tread design is provided.

REFERENCES

Patent References
1. U.S. Pat. No. 5,814,718. Andresen,et al. Sep. 29, 1998 Method and apparatus for measuring or controlling friction
2. U.S. Pat. No. 5,859,919. Holland, et al. Jan. 12, 1999 Method and system for measuring surface roughness using fractal dimension values Literature References
1. Majumdar, A. and Bhushan, B. *Fractal Model of Elastic-Plastic Contact Between Surfaces*. Journal of Tribology. 113:1–11, 1991.
2. Majumdar, A. and Bhushan, B. *Role of Fractal Geometry in Roughness Characterization and Contact Mechanics of Surfaces*. Journal of Tribology. 112:205, 1990.
3. Majumdar, A. and Tien, C. L. *Fractal Characterization and Simulation of Rough Surfaces*. Wear. 136:313–337, 1990.
4. Pullen J. and Williamson, J. B. P. *On the plastic contact of rough surfaces*. Proc. Roy. Soc. London A. 327:159–173, 1972.
5. Stachowiak, G. W. and Batchelor, A. W. *Fundamentals of Contact Between Solids*. Engineering Tribology, Elsevier, N.Y. Chapter 10, 527–555, 1994.
6. Sayles, R. S. and Thomas, T. R. *The Spatial Representation of Surface Roughness by Means of the Structure Function: A Practical Alternative to Correlation*. Wear. 42:263–276, 1977.
7. Whitehouse, D. J and Archard, J. F. *The properties of random surfaces of significance in their contact*. Proc. Roy. Soc. Lond. A. 316, 97–121, 1970.

The invention claimed is:

1. A method of designing tread for a traction surface, comprising the steps of:
   (a) selecting a substrate surface intended for frictional contact with the traction surface;
   (b) characterizing the topography of said substrate surface;
   (c) selecting a pattern having fractal characteristics corresponding to said characterized topography of said substrate surface; and then
   (d) generating a tread design which incorporates said pattern.

2. The method of claim 1,
wherein the step of:
   (a) selecting a substrate surface intended for frictional contact with the traction surface comprises a substep of:
   (a.1) identifying acceptable traction between said fraction surface and said substrate surface;
and wherein the step of:
   (b) characterizing said topography of said substrate surface comprises a substep of:
   (b.1) measuring the dimensions of said substrate surface with which said tread is intended for contact;
and wherein the step of:
   (c) selecting a pattern having fractal characteristics corresponding to said characterized topography of said substrate surface comprises substeps of
   (c.1) generating a plurality of experimental treads having fractal characteristics; and
   (c.2) generating an experimental surface approximating or being said measured surface;
and wherein the step of:
   (d) generating a tread design which incorporates said pattern is followed by the steps of:
   (e) testing said tread design by measuring the friction force between each of said experimental treads and said experimental surface;
   (f) iteratively repeating steps (c) to (e) until the measured friction force between one of said experimental treads and said experimental surface is at least the acceptable traction identified in step (a.1);
   (g) selecting the pattern of an experimental tread having at least the acceptable traction identified in step (a.1); and
   (h) generating a final tread design which incorporates the selected pattern.

3. A tire tread designed by the method of claim 2, comprising a plurality of tread elements defining protuberances and voids on an outer tire surface;said tire tread being circumferentially positioned on the outer tire surface for contact with a road surface;
   whereby said tread elements define a pattern having fractal characteristics.

4. A tread of claim 3, wherein the selected substrate surface intended for contact with the tread is snow.

5. A tread of claim 3, wherein the selected substrate surface intended for contact with the tread is sand.

6. The method of claim 1, wherein the step of:
   (b) characterizing said topography of said substrate surface comprises the substeps of:
   (b.1) generating a surface roughness profile;
   (b.2) representing said topography as a log-log power spectrum;
   (b.3) subjecting said power spectrum to a waveform transformation; and
   (b.4) approximating said transform of said topography by an ideal waveform;
and wherein the step of:
   (c) selecting a pattern having fractal characteristics corresponding to said characterized topography of said substrate surface comprises a substep of:
   (c.1) selecting a pattern having fractal characteristics that matches said ideal waveform approximating the substrate surface substrate topography.

7. A tire tread designed by the method of claim 6, comprising a plurality of tread elements defining protuberances and voids on an outer tire surface;
   said tire tread being circumferentially positioned on the outer tire surface for contact with a road surface;
   whereby said tread elements define a pattern having fractal characteristics.

8. A tread of claim 7, wherein the selected substrate surface intended for contact with the tread is snow.

9. A tread of claim 7, wherein the selected substrate surface intended for contact with the tread is sand.

10. The method of claim 1, wherein said pattern has a plurality of elements, each of said elements being a member of a size group, wherein the length of one or more dimensions of each member of each size group is the same as that of the corresponding dimension of the other members of the size group, and wherein the relative number of elements in each size group in said pattern corresponds to the relative number of elements in a corresponding size group in the substrate intended for contact with the traction surface.

11. The method of claim 10, wherein the length of one or more dimensions of elements in each said size group in said pattern is one-half of the corresponding dimension of the elements in the next larger size group in said pattern.

12. The method of claim 10, wherein if the length of one or more dimensions of elements in each said size group is represented by n then the corresponding dimension of the elements in each next larger size group in said pattern is $n^2$.

13. The method of claim 10, wherein if the length of one or more dimensions of elements in each said size group is represented by n then the corresponding dimension of the elements in each next larger size group in said pattern is $n^3$.

14. The method of claim 10, wherein if the length of one or more dimensions of elements in each said size group is represented by n then the corresponding dimension of the elements in each next larger size group in said pattern is $2^n$, wherein n is a real number from 1 to 2.

15. The method of claim 1, wherein said pattern having fractal characteristics comprises elements having rectilinear shape.

16. The method of claim 1, wherein said pattern having fractal characteristics comprises elements having curvilinear shape.

17. The method of claim 16, wherein said pattern having fractal characteristics further comprises elements having said rectilinear shape.

18. The method of claim 1, wherein said pattern having fractal characteristics comprises elements of circular shape.

19. The method of claim 1, wherein said pattern having fractal characteristics comprises elements of triangular shape.

20. The method of claim 1, wherein said pattern having fractal characteristics comprises elements of cone shape.

21. The method of claim 1, wherein said pattern having fractal characteristics comprises elements of H shape.

22. The method of claim 1, wherein said pattern having fractal characteristics comprises elements of cylindrical shape.

23. The method of claim 1, wherein the tread designed by said method is a shoe tread, a belt drive tread, a tire tread, a tread for an elastomeric traction surface, a drive roller tread, a tread for friction wheels for material locomotion, a tread for power transmission, a belt drive tread for a pulley drive or other device requiring friction to transmit a tractional force.

* * * * *